(12) United States Patent
Henry (10) Patent No.: US 6,821,223 B2
(45) Date of Patent: Nov. 23, 2004

(54) COMBINATION STARTER-GENERATOR

(75) Inventor: Rassem Ragheb Henry, Clinton Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/420,222

(22) Filed: Apr. 22, 2003

(65) Prior Publication Data

US 2003/0199350 A1 Oct. 23, 2003

Related U.S. Application Data

(62) Division of application No. 09/865,210, filed on May 24, 2001, now abandoned.
(60) Provisional application No. 60/273,191, filed on Mar. 2, 2001.

(51) Int. Cl.[7] ................................................ F16H 7/08
(52) U.S. Cl. ........................ 474/134; 474/109; 474/110
(58) Field of Search ................................ 474/137, 101, 474/109, 111, 113–117, 133–136, 138

(56) References Cited

U.S. PATENT DOCUMENTS

| | | | |
|---|---|---|---|
| 4,346,773 A | 8/1982 | Hofbauer et al. | 180/165 |
| 4,699,097 A | 10/1987 | Tanaka et al. | 123/192 R |
| 4,711,207 A | 12/1987 | Bonvallet | 123/198 F |
| 4,758,208 A | 7/1988 | Bartos et al. | 474/135 |
| 4,822,321 A | 4/1989 | Webb | 474/117 |
| 4,862,009 A | 8/1989 | King | 290/22 |
| 5,103,127 A | 4/1992 | Peter | 310/113 |
| 5,126,582 A | 6/1992 | Sugiyama | 290/46 |
| 5,132,604 A | 7/1992 | Shimane et al. | 322/10 |
| 5,176,581 A | 1/1993 | Kumm | 474/110 |
| 5,362,280 A | 11/1994 | Hirai et al. | 474/135 |
| 5,418,400 A | 5/1995 | Stockon | 290/46 |
| 5,467,748 A | 11/1995 | Stockhausen | 123/198 F |
| 5,524,725 A | 6/1996 | Schantzen | 180/190 |
| 5,598,814 A | 2/1997 | Schroeder et al. | 123/90.11 |
| 5,613,918 A | 3/1997 | Fleischman | 474/134 |
| 5,642,703 A | 7/1997 | Stockhausen et al. | 123/198 F |
| 5,934,263 A | 8/1999 | Russ et al. | 123/698 |
| 6,002,219 A | 12/1999 | Permuy | 318/139 |
| 6,011,377 A | 1/2000 | Heglund et al. | 318/701 |
| 6,034,492 A | 3/2000 | Saito et al. | 318/141 |
| 6,059,059 A | 5/2000 | Schmidt-Brucken | 180/65.3 |
| 6,125,808 A | 10/2000 | Timewell | 123/179.5 |
| 6,563,247 B2 | 5/2003 | Nguyen | |
| 6,609,582 B1 | 8/2003 | Botti et al. | |

FOREIGN PATENT DOCUMENTS

JP          2000081100 A     3/2000

*Primary Examiner*—David A. Bucci
*Assistant Examiner*—Timothy McAnulty
(74) *Attorney, Agent, or Firm*—Jimmy L. Funke (57) ABSTRACT

A combination starter-generator system for use in a vehicle is provided. The vehicle has an internal combustion engine and a battery. The system includes a starter-generator electrically coupled to the battery to generate a current and to start the internal combustion engine. A drive mechanism connects the starter-generator machine and the internal combustion engine. The starter-generator machine generates the current by receiving a charging torque from one side of the drive mechanism and starts the internal combustion engine by imparting a starting torque to a different side of the drive mechanism. The charging torque or the starting torque is a greater torque. A passive tensioning system cooperates with the drive mechanism to tension the drive mechanism only at the side of the greater torque.

12 Claims, 7 Drawing Sheets

COMBINATION STARTER-GENERATOR

CROSS REFERENCE TO RELATED APPLICATION

This application is a divisional application of U.S. patent application Ser. No. 09/865,210, filed May 24, 2001 now abandoned. This application also claims the benefit of U.S. Provisional Patent Application No. 60/273,191 filed on Mar. 2, 2001, the contents of which are incorporated herein.

TECHNICAL FIELD

This application relates generally to vehicles having a combination starter-generator. More specifically, this application relates to tensioning systems and drives for combination starter-generators.

BACKGROUND

Prior internal combustion engine includes both a starter machine and a generator or alternator machine (hereinafter generator). The starter provides an engine-cranking torque to the flywheel or crankshaft of the engine in order to rotate the camshaft and facilitate the movement of the pistons during the ignition of the engine. The generator provides an electrical output in order to meet the electrical loads of the vehicle, as well as to charge the vehicle's battery. Generally, a torque is applied to a pulley of the generator by a belt frictionally engaged with a pulley of the generator and a pulley of the engine in order to generate the electrical charge from the generator.

The concept of using only one machine to do both functions, namely starting and generating, adds efficiency. Thus, starter-generators use less space, weigh less, eliminate the cost of one of the machines and reduce assembly time. However, starter-generators give rise to issues described below that affect the cost, complexity, and reliability of such starter-generator systems. Accordingly, there is a continuing need for inexpensive, reliable tensioning systems for starter-generators.

SUMMARY

A combination starter-generator system for use in a vehicle having an internal combustion engine is provided. A drive mechanism connects the starter-generator machine and the internal combustion engine. The starter-generator machine generates a current by receiving a charging torque from one side of the drive mechanism and starts the internal combustion engine by imparting a starting torque to a different side of the drive mechanism. Depending on the application, the charging torque or the starting torque is a greater torque. A passive tensioning system cooperates with the drive mechanism to tension the drive mechanism only at the side of the greater torque.

An apparatus for starting an internal combustion engine having a starter-generator machine is provided. The starter-generator machine is operable in a first direction for generating a current and a second direction for starting the internal combustion engine. A drive mechanism connects the starter-generator machine and the internal combustion engine by a non-adjusting gear ratio in a range between 2:1 to 3:1. The starter-generator machine operates in the first direction to generate a current by receiving a charging torque from the internal combustion engine imparted to a first side of the drive mechanism. The starter-generator machine operates in the second direction to start the internal combustion engine by imparting a starting torque to a second side of the drive mechanism. A first tensioning system cooperates with the drive mechanism to tension the drive mechanism at the first side during application of the charging torque. A second tensioning system cooperates with the drive mechanism to tension the drive mechanism at the second side during application of the starting torque.

An active tensioning system for use on a drive mechanism is provided. The drive mechanism creates a first slack side and a first tight side of the drive mechanism. The drive mechanism also creates a second slack side and a second slack side of the drive mechanism. The first slack side and the second tight side are coincident. Similarly, the second slack side and the first tight side are coincident. The active tensioning system has a guide. A first idler sprocket is operatively coupled with the first slack side of the drive mechanism and is slidable on the guide. A second idler sprocket is operatively coupled with the second slack side of the drive mechanism and is also slidable on the guide. A spring connects the first idler sprocket and the second idler sprocket. The spring also biases the first idler sprocket and the second idler sprocket towards one another such that upon creation of the first slack side and the first tight side, the first tight side acts upon the second idler sprocket to slide the first idler sprocket and the second idler sprocket upon the guide to tension the drive mechanism, and such that upon creation of the second slack side and the second tight side, the second tight side acts upon the first idler sprocket to slide the first idler sprocket and the second idler sprocket upon the guide to tension the drive mechanism.

A combination starter-generator system is provided. The vehicle has an internal combustion engine and a starter-generator machine for generating a current and starting the internal combustion engine. A drive mechanism connects the starter-generator machine and the internal combustion engine. The starter-generator machine charges the battery by receiving a charging torque from a first side of the drive mechanism. The starter-generator machine starts the internal combustion engine by imparting a starting torque to a second side of the drive mechanism. The drive mechanism compensates for differences in the charging torque and the starting torque with a non-adjusting gear ratio in a range between 2:1 to 3:1. An active tensioning system cooperating with the drive mechanism to tension the drive mechanism at the first side during application of the charging torque or at the second side during application of the starting torque.

The above-described and other features and advantages of the present invention will be appreciated and understood by those skilled in the art from the following detailed description, drawings, and appended claims.

DESCRIPTION OF THE PREFERRED EMBODIMENT

Starter-generators give rise to issues that affect the cost, complexity, and reliability of such systems. First, the drive mechanism connected to a starter-generator handles power in two directions, which presents a unique tensioning problem for the drive mechanism. Second, there is a large gap between torque and speed requirements for starting an engine versus generating electricity. The differing torque and speed requirements have typically been overcome by the use of transmission having a different ratio for each the starting function and the generating function. Such transmissions typically required a gearbox and a switching clutch, which adds cost, complexity, and decreased reliability of starter-generators.

Figure 1:
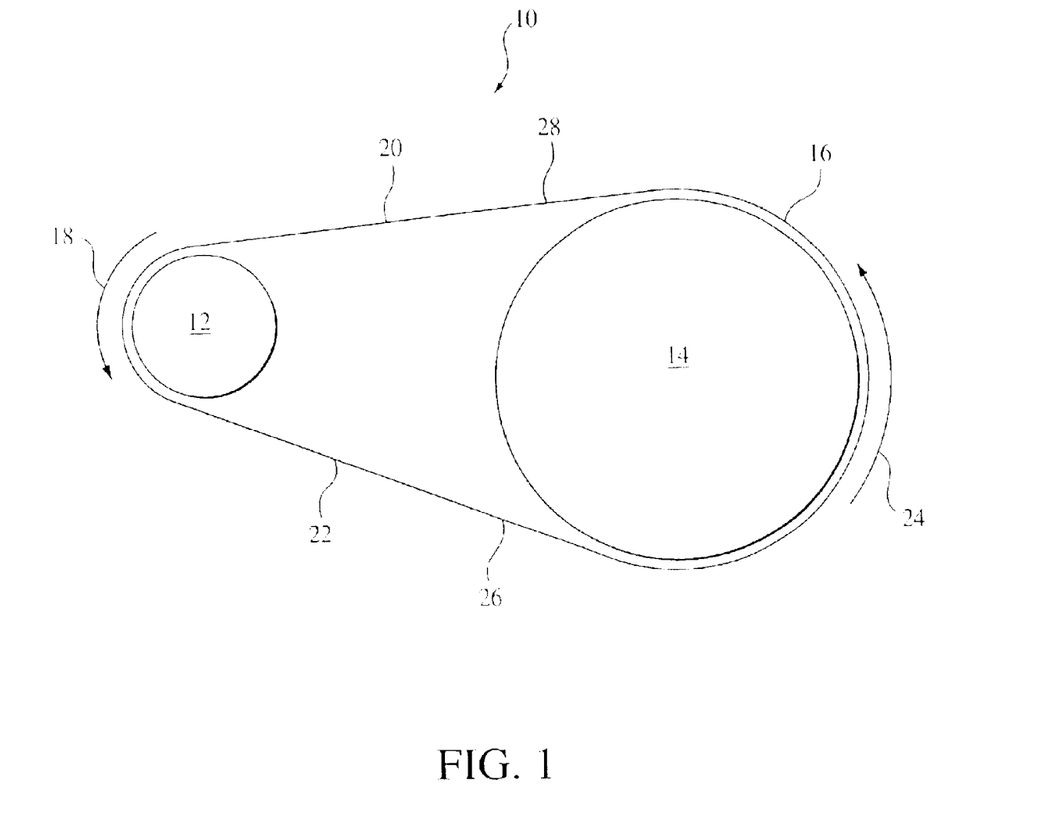
FIG. 1 is a front view of a belt or chain drive mechanism.

Referring to the Figures and particularly to FIG. 1, a belt or chain drive mechanism 10 is shown handling power transmission in two directions, and, thus illustrates the unique tensioning problem for the drive mechanism. Drive mechanism 10 includes a first pulley or sprocket 12, a second pulley or sprocket 14 and a chain or belt 16. In the instance where first sprocket 12 is the drive sprocket driving mechanism 10 in the direction of arrow 18, second sprocket 14 becomes the driven sprocket and first sprocket 12 acts on chain 16 such that the chain has a tight-side or pulled-side 20 and a slack-side or pushed side 22.

Conversely, in the instance where second sprocket 14 is the drive sprocket driving mechanism 10 in the direction of arrow 24, first sprocket 12 becomes the driven sprocket and second sprocket 14 acts on chain 16 such that the chain has a tight-side 26 and a slack-side 28. In either instance, a chain tensioner is needed on slack-side 22 and 28 to maintain chain 16 operatively engaged with drive sprocket 12 and 14, respectively. Thus, where the drive sprocket and the driven sprocket change place, the tight-side and slack-side of drive mechanism 10 also change place, giving rise to a need for more than one tensioner in the drive mechanism. It should be noted that the belt or chain of drive mechanism 10 does not change its direction of rotation, rather only the source of power (i.e., the drive sprocket) changes.

Figure 7:
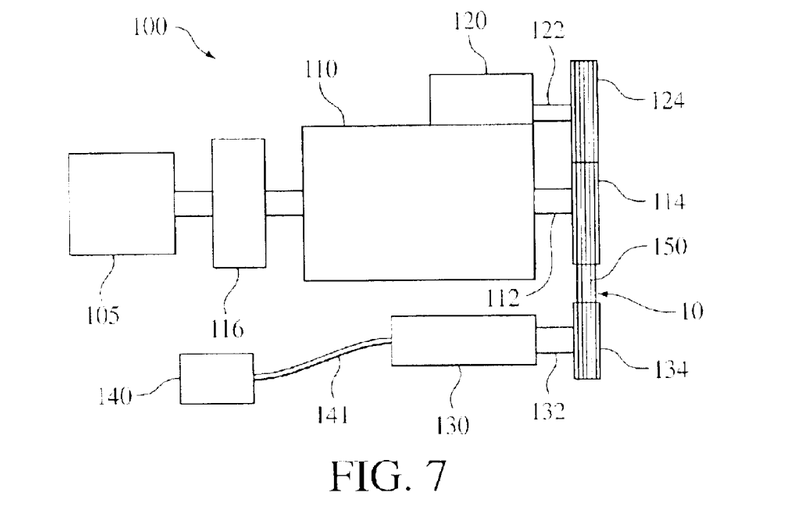
FIG. 7 is a top view of a first embodiment of a starter-generator system.
Figure 12:
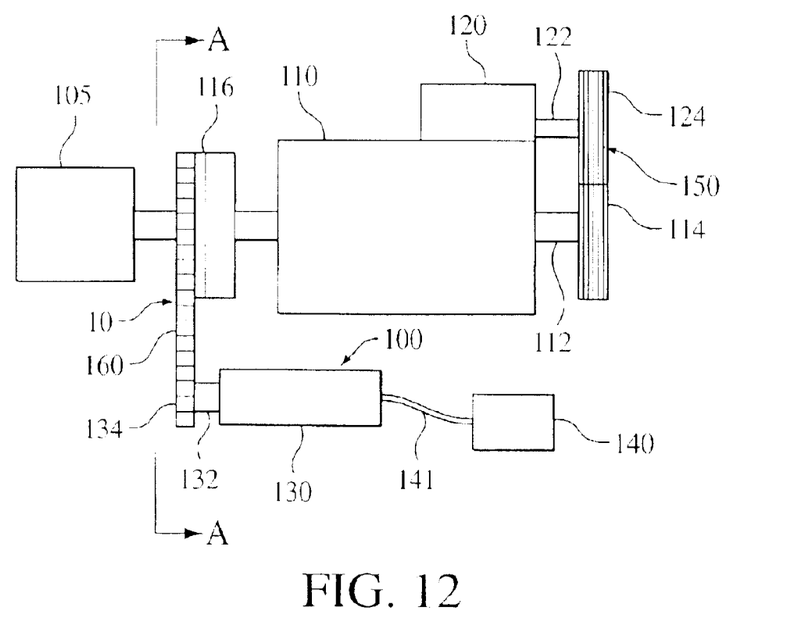
FIG. 12 is a top view of a second embodiment of a starter-generator system.
Figure 14:
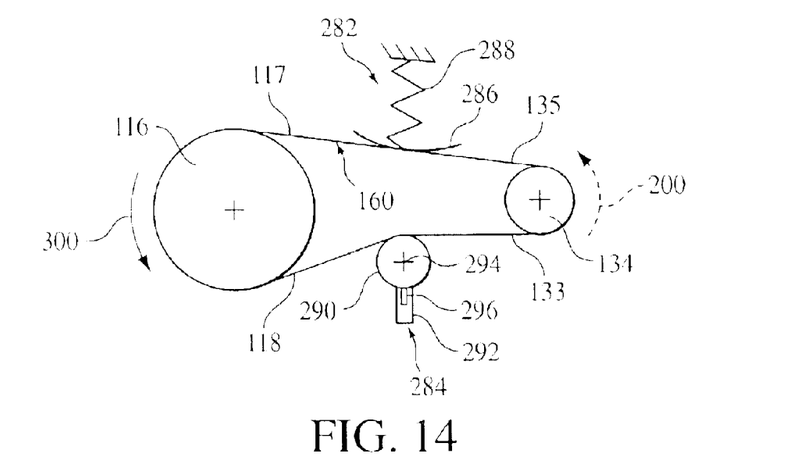
FIG. 14 is a view of a second embodiment of a tensioning system on the starter-generator system of FIG. 12, taken along lines A—A.

Embodiments of starter-generator system 100 are illustrated in FIGS. 7, 12 and 14. Generally, system 100 provides a starting function to an internal combustion engine 110 and a generating function to a battery 140. System 100 includes a starter-generator 130 electrically coupled to battery 140 by a lead 141. Starter-generator 130 is operatively connected to engine 110 by a belt or chain drive mechanism 10. Thus, starter-generator 130 performs dual functions of starting engine 110 and generating electrical output to battery 140. Belt or chain drive mechanism 10 is described in this application by way of example as either a belt drive mechanism or a chain drive mechanism, however both belt and chain drive mechanisms are considered within the scope of the present invention.

Starter-generator 130 is adapted to provide either an engine-cranking torque 200 to drive mechanism 10 or receive a generator-cranking torque 300 from the drive mechanism. By way of example, operation of starter-generator 130 is described with respect to FIGS. 2 through 6. Starter-generator 130 is a three-phase rotary machine including a rectifier bridge 30 and a unit 32 for controlling the rectifier bridge. Starter-generator 130 includes a coil-carrying rotor 34 constituting the primary magnetic circuit associated with two rings and with two brushes that convey excitation current (of the order of a few amps); and a stator 36 carrying a plurality of coils constituting the secondary magnetic circuit, connected in star or delta configuration in the common case of a three-phase structure and acting, during generating operation, to deliver converted electrical power to the rectifier bridge 30 (several tens of amps at a voltage of the same order as the battery voltage).

Figure 2:
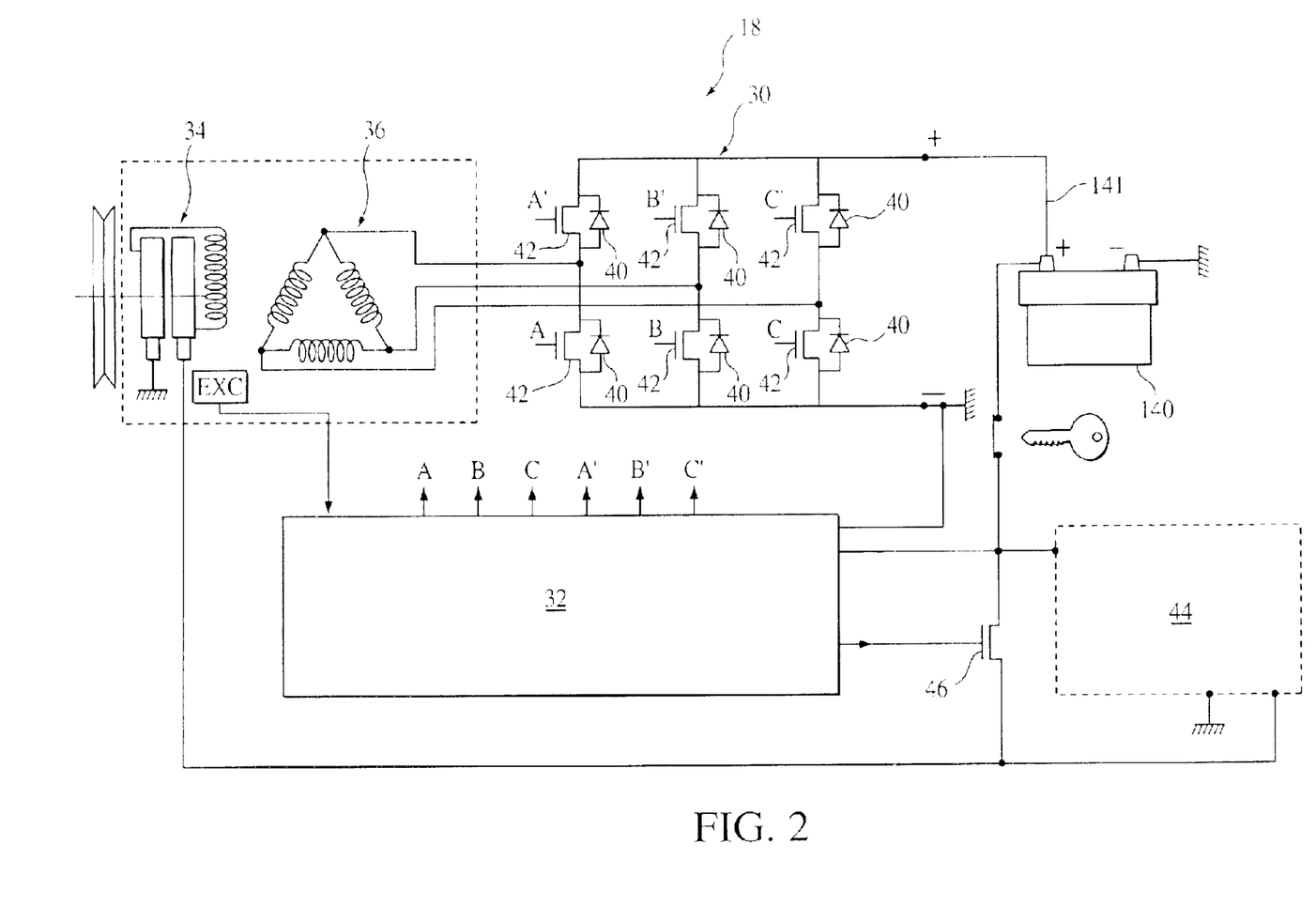
FIG. 2 is a block diagram of a starter-generator circuit.
Figure 3:
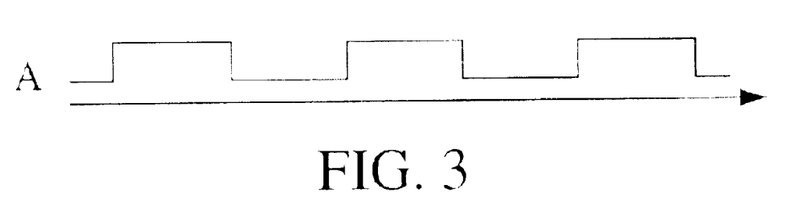
FIG. 3 is a first step of a control sequence of the circuit of FIG. 2.
Figure 4:
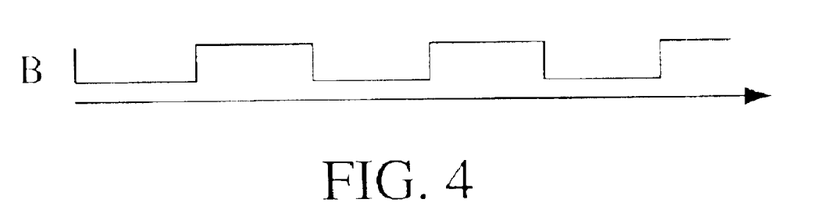
FIG. 4 is a second step of a control sequence of the circuit of FIG. 2.
Figure 5:
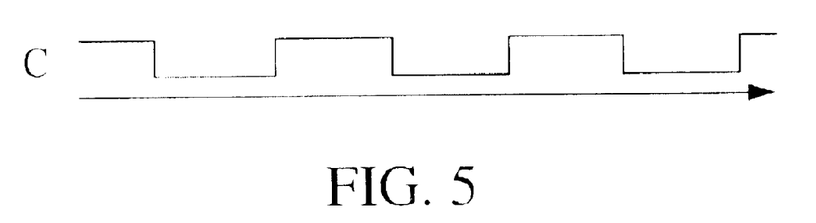
FIG. 5 is a third step of a control sequence of the circuit of FIG. 2.

Bridge 30 is connected to the various phases of the stator 36 and is connected between ground and a power supply terminal of a battery 140. Bridge 30 includes a plurality of diodes 40 forming a rectifier bridge, and a plurality of switches 42, such as transistors. Switches 42 are connected in parallel with respective diodes 40 and control the various phases (e.g., starting and generating) of starter-generator 130.

During a starting function, diodes 40 act as freewheel diodes, whereas in a generating function, the diodes act as a rectifier bridge. Switches 42 are advantageously MOSFET type transistors. Switches 42 include a diode between drain and source. Consequently, the switches 42 enable bridge 30 to be implemented using transistor components only that then act both as switches and as freewheel diodes.

Figure 6:
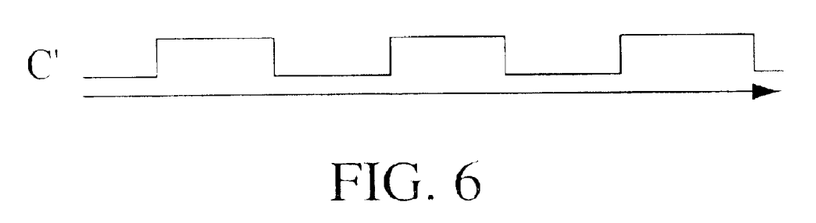
FIG. 6 is a fourth step of a control sequence of the circuit of FIG. 2.

The starting function of starter-generator 130 is achieved by imposing DC on the primary magnetic circuit rotor 34 and by delivering signals that are phase-shifted by 120 degrees to the phases of stator 36, which signals are ideally sinewave signals, but may optionally be squarewave signals or trapezoidal wave signals. Referring now to FIGS. 3 through 6, an example of a control sequence for switches 42 is illustrated. The sequence is made up of squarewave signals issued by the control unit. The signals A, B, and C shown in these Figures are control signals for those of switches 42 in bridge 30 which are connected to ground. The signals A', B', and C' which control the other transistors, i.e. those connected to battery 140, are signals that are inverted relative to the signals A, B, and C, without overlapping them. This is shown in FIG. 6 where the signal C' is drawn for controlling the transistor connected to the transistor controlled by the signal C. With this kind of control, the rotor performs one full revolution while each of the phases goes through a number of periods equal to the number of pairs of poles of the rotor (e.g. eight).

This starting operation is used for driving engine 110 to start it, thereby making it possible to eliminate the starter and the associated drive ring, and also the power cabling generally associated with the starter. To enable engine 110 to be started in this way, the control signals for switches 42 are advantageously variable frequency signals, at a frequency that is regulated to be increasing by unit 32, so as to avoid any slip of the rotor relative to the rotating magnetic field created by the stator. For example, frequency regulation may be provided by unit 32 in such a manner so as to guarantee that the alternator has a speed profile enabling the engine to be started.

Control unit 32 includes a means for recognizing a code signal that authorizes engine starting. This signal is transmitted to the unit 32 by a code transmitter means inside the vehicle. The unit 32 switches on the transistors 42 in a manner suitable for starting the engine only if it receives the code signal. Consequently, the control unit 32 and the code transmitter means which transmit the unlocking signal to said unit, constitute a system for immobilizing the engine.

After engine 110 has started, unit 32 controls the transistors 42 so as to operate in a generating mode. Unit 32 controls switches 42 so that all of them are open circuit across the terminals of all of the diodes. The bridge 32 then reverts to being a rectifier bridge. In another possible embodiment, the transistors 42 are controlled so as to short circuit the conductive diodes. They are caused to be open circuit only across the terminals of non-conductive diodes. Thus, a current no longer passes through the conductive diodes, such that the short circuits made in this way serve to reduce losses. To synchronize control of transistors 42 relative to the switching from the conductive state to the non-conductive state of diodes 40, unit 32 is connected to a means for detecting when diodes 40 pass from one state to another. By way of example, these means may be constituted by a sensor, such as a Hall effect sensor, for measuring the angular position of the rotor relative to the stator. Such a sensor may also be used for determining the speed of the rotor, e.g. by counting pulses in a given time window, so as to enable the unit to detect that engine 110 has started and thus switch from operating in starting mode to operating in generating mode.

Also, means 44 are provided for regulating voltage so as to maintain the voltage of battery 140 at a suitable level. Provision is also made for a switch 46, e.g. another MOSFET type switch, whose ON or OFF state is controlled by the control unit. Switch 46 is designed to short circuit the regulator in starting mode so that the secondary magnetic circuit 36 is then directly excited by battery 140.

Thus when starter-generator 130 is in the starting mode, engine-cranking torque 200 is applied by drive mechanism 10 from the starter-generator to engine 110. Moreover, when starter-generator 130 is in the generating mode, generator-cranking torque 300 is applied by drive mechanism 10 from engine 110 to the starter-generator. It should be recognized that the operation of starter-generator 130 has been described above by way of example only and that other starter-generators adapted to provide a starting function to engine 110 and a generating function to battery 140 are considered within the scope of the present invention.

Starter-generator 130 described above is adapted for use in the position typically used for either automobile starters or alternators. Therefore, no complicated design changes to engine 110 are required for implementation of starter-generator 130.

Referring now to FIG. 7, a tensioning system 100 is illustrated. System 100 includes engine 110, a starter-generator 130 electrically coupled to battery 140 by a lead 141 and belt or chain drive mechanism 10. Once started, engine 110 drives a flywheel 116 operatively connected to a transmission 105 to propel the vehicle. Drive mechanism 10 has a single belt 150 connected to engine 110, and starter-generator 130.

Engine 110 includes a crankshaft 112 having a crank pulley 114 operatively connected thereto. Similarly, starter-generator 130 includes a starter-generator shaft 132 having a starter-generator pulley 134 operatively connected thereto. Belt 150 is configured to frictionally engage pulleys 114 and 134. In addition, and if necessary, belt 150 is configured to drive pulleys of other vehicle accessory systems, including but not limited to cooling systems, air conditioning systems and power steering systems. For example, a pulley 124 is illustrated as driving a water pump 120 of an engine cooling system. Of course, other systems may or may not be driven by belt 150. At a minimum, system 100 includes belt 150 and pulleys 114 and 134. Thus, as crank pulley 14 is driven by engine 110, belt 150 rotates pulleys 114 and 134.

Upon activation by a user, starter-generator 130 draws energy from battery 140 through lead 141 to rotate starter-generator shaft 132. Shown in FIG. 8, starter-generator shaft 132 in turn rotates starter-generator pulley 134 to impart engine-cranking torque 200 to belt 150. Thus, belt 150 being operatively connected to crank pulley 114 drives crankshaft 112. Engine-cranking torque 200 acts on crankshaft 112 to rotate engine 110 as required for engine starting procedures.

Figure 8:
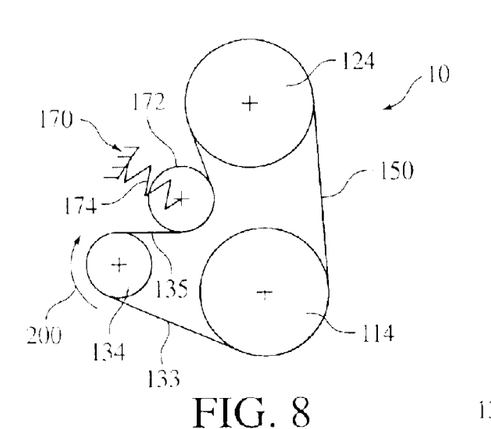
FIG. 8 is a front view of a first embodiment of a tensioning system for the starter-generator system of FIG. 7.

As shown in FIG. 8, during the starting of engine 110, belt 150 has a tight-side 133 and a slack-side 135 created on either side of starter-generator pulley 134. A passive tensioning system 170 is provided at slack-side 135 of belt 150 to remove the slack, keeping the belt in operative engagement with starter-generator pulley 134. Passive tensioning system 170 includes an idler pulley 172 biased into operative engagement with belt 150 so as to remove the slack from slack-side 135 of the belt. Preferably, pulley 172 is biased into operative engagement with belt 150 by a spring connection 174 mounted on engine 110 or elsewhere on the vehicle, such as, but not limited to the transmission, the exhaust manifold, or the vehicle body.

After engine 110 has been started, starter-generator 130 generates an electrical output to battery 140 through lead 141. Shown in FIG. 9, engine 110 rotates crankshaft 112 and crankshaft pulley 114 to impart a generator-cranking torque 300 to belt 150. Thus, belt 150 being operatively connected to starter-generator pulley 134 drives starter-generator shaft 132. Generator-cranking torque 300 acts on starter-generator shaft 132 to rotate starter-generator 130, which generates the electrical output to battery 140 through lead 141. Starter-generator 130 is described by way of example as receiving electrical energy from and providing electrical energy to battery 140, however it is considered within the scope of the present invention for the starter-generator to receive or provide electrical energy to or from other devices. In one embodiment, generator-cranking torque 300 also acts to rotate pump pulley 124 of water pump 120 in order to provide a flow of cooling fluid to engine 110 as required in engine cooling systems.

Figure 9:
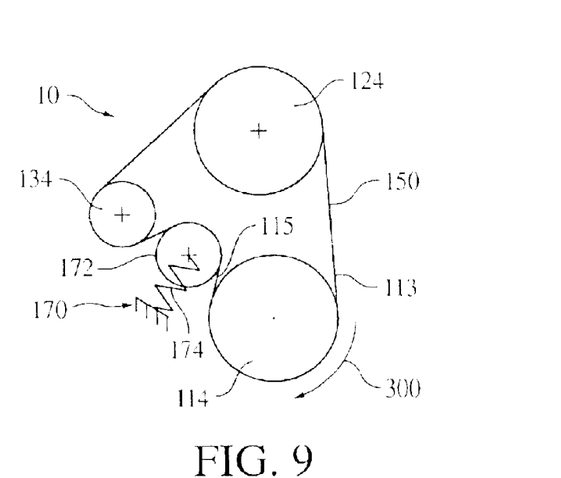
FIG. 9 is a front view of second embodiment of a tensioning system for the starter-generator system of FIG. 7.

During the generation of the electrical output to battery by starter-generator 130 shown in FIG. 9, belt 150 has a tight-side 113 and a slack-side 115 on either side of crankshaft pulley 114. Passive tensioning system 170 is also provided at slack-side 115 of belt 150 to remove the slack, keeping the belt in operative engagement with crankshaft pulley 114. Idler pulley 172 is biased into operative engagement with belt 150 so as to remove the slack from slack-side 115 of belt 150. Preferably, pulley 172 is biased into operative engagement with belt 150 by spring connection 174 mounted on engine 110 or elsewhere on the vehicle, such as, but not limited to the transmission, the exhaust manifold, or the vehicle body Accordingly, tensioning system 170 maintains belt 150 in engagement with pulleys 114 and 134 during the charging and starting operations, respectively. It has been determined that drive mechanism 10 having tensioning system 170 only on the slack-side of the pulley 114 or 134 generating the greater torque is sufficient for proper operation of starter-generator 130. More specifically, passive tensioning system 170 is placed at slack side 115 when generator-cranking torque 300 is greater than engine-cranking torque 200 as shown in FIG. 9. Alternately, passive tensioning system 170 is placed at slack-side 135 when engine-cranking torque 200 is greater than generator-cranking torque 300, as shown in FIG. 8.

For example, if engine-cranking torque 200 is greater than generator-cranking torque 300 (e.g., engine 110 is started at very cold ambient temperatures when oil in the engine is very viscous), then tensioning system 170 is provided only at slack-side 135. Oppositely, if engine-cranking torque 200 is lower than generator-cranking torque 300 (e.g., high electrical load on battery 140), then tensioning system 170 is provided only at slack-side 115. The life of belt 150 is typically inversely proportional to its maximum tension. Thus, placing passive tensioning system 170 only on one of slack-sides 115 and 135 increases the service life of belt 150.

Figure 10:
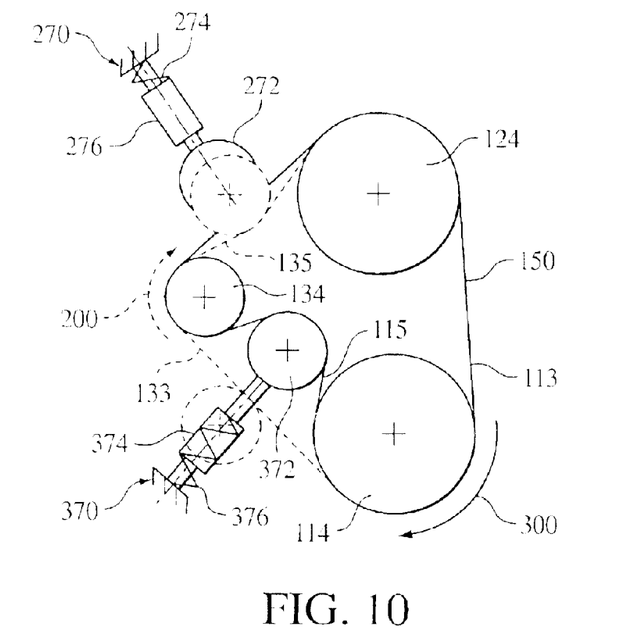
FIG. 10 is a front view of third embodiment of a tensioning system for the starter-generator system of FIG. 7.

An alternate embodiment of the tensioning system is illustrated in FIG. 10. Here, component parts performing similar or analogous functions are numbered in multiples of one hundred. In this embodiment, an active tensioning system 270 is provided for starter-generator pulley 134 and an active tensioning system 370 is provided for crank pulley 114. Active tensioning systems 270 and 370 actively or automatically engage drive mechanism 10 as needed. In this embodiment, active tensioning system 270 includes an idler pulley 272, a spring connection 274, and a solenoid 276. Spring connection 274 is mounted on engine 110 or elsewhere on the vehicle, such as, but not limited to the transmission, the exhaust manifold, or the vehicle body. Solenoid 276 is adapted to extend idler pulley 272 into operative engagement with slack-side 135, and spring connection 274 is adapted to retract the idler pulley upon deactivation of the solenoid. Similarly, active tensioning system 370 includes an idler pulley 372, a spring connection 374 and a solenoid 376. Spring connection 374 is mounted on engine 110 or elsewhere on the vehicle, such as, but not limited to the transmission, the exhaust manifold, or the vehicle body. Solenoid 376 is adapted to extend idler pulley 372 into operative engagement with slack-side 115, and spring connection 374 is adapted to retract the idler pulley upon deactivation of the solenoid.

Thus, during starting when engine-cranking torque 200 is imparted to belt 150 to create slack-side 135 and tight-side 133 (shown in FIG. 10 in dotted lines), solenoid 276 of active tensioning system 270 is activated to extend idler pulley 272 into operative engagement with the slack-side. After engine 110 has been started and engine-cranking torque 200 is removed from belt 150, solenoid 276 of active tensioning system 270 is deactivated such that spring connection 274 retracts idler pulley 272 out of operative engagement with slack-side 135.

Similarly, during generation of energy when generator-cranking torque 300 is imparted to belt 150 to create slack-side 115 and tight-side 113 (shown in FIG. 10 in solid lines), solenoid 376 of active tensioning system 370 is activated to extend idler pulley 372 into operative engagement with the slack-side. After battery 140 has been charged and generator-cranking torque 300 is removed from belt 150, solenoid 376 of active tensioning system 370 is deactivated such that spring connection 374 retracts idler pulley 372 out of operative engagement with slack-side 115.

The selective extension and retraction of active tensioning systems 270 and 370 increases the service life in belt 150 since, as discussed above, the life of the belt 150 is inversely proportional to its maximum tension.

Figure 11:
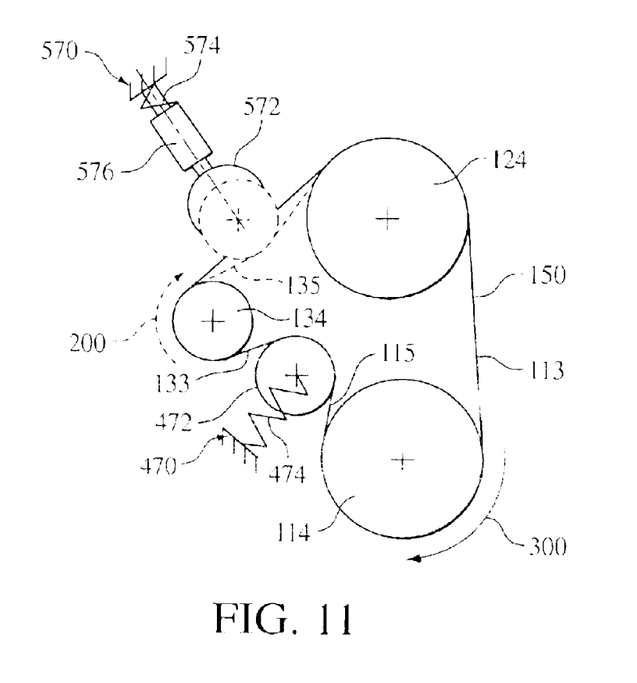
FIG. 11 is a front view of fourth embodiment of a tensioning system for the starter-generator system of FIG. 7.

Another embodiment of the tensioning system is provided in FIG. 11. In this embodiment, passive tensioning system 470 is provided for crank pulley 114 and active tensioning system 570 is provided for starter-generator pulley 134. Active tensioning system 570 includes an idler pulley 572, a spring connection 574, and solenoid 576. Spring connection 574 is mounted on engine 110 or elsewhere on the vehicle, such as, but not limited to the transmission, the exhaust manifold, or the vehicle body. Solenoid 576 is adapted to extend idler pulley 572 into operative engagement with slack-side 135, and spring connection 574 is adapted to retract the idler pulley upon deactivation of the solenoid. Passive tensioning system 470 includes idler pulley 472 and spring connection 474 mounted on engine 110 or elsewhere on the vehicle, such as, but not limited to the transmission, the exhaust manifold, or the vehicle body. Spring connection 474 biases idler pulley 472 into operative engagement with slack-side 115. In this embodiment, spring connection 474 of passive tensioning system 470 biases idler pulley 472 into operative engagement with slack side 115 regardless of the state of generator-cranking torque 300.

Thus, during starting when engine-cranking torque 200 is imparted to belt 150 to create slack-side 135 and tight-side 133 (shown in FIG. 11 in dotted lines), solenoid 576 of active tensioning system 570 is activated to extend idler pulley 572 into operative engagement with the slack-side. After engine 110 has been started and engine-cranking torque 200 is removed from belt 150, solenoid 576 of active tensioning system 570 is deactivated such that spring connection 574 retracts idler pulley 572 out of operative engagement with slack-side 135.

The selective extension and retraction of tensioning system 570 increases the service life in belt 150 since, as discussed above, the life of the belt is typically inversely proportional to its maximum tension. The inclusion of one active tensioning system 570 and one passive tensioning system 470 decreases complexity and cost. Active tensioning system 570 has a low power/energy requirement since solenoid 576 is activated for only used for a very short time, namely during engine cranking.

Active tensioning systems 270, 370, and 570 are described above by way of example as including solenoids 276, 376, and 576 and spring connections 274, 374, and 574. However, alternate devices for extending and retracting idler pulley 272, 372, and 574 are considered within the scope of the present invention. For example, alternate embodiments include, but are not limited to, extension and retraction by an actuator, or a lever.

Figure 13:
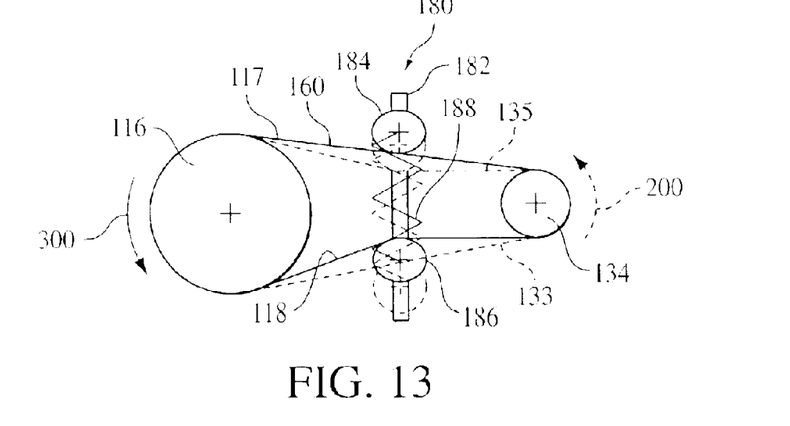
FIG. 13 is a view of a first embodiment of a tensioning system on the starter-generator system of FIG. 12, taken along lines A—A.

An alternate embodiment of starter-generator system 100 is illustrated in FIGS. 12 through 14. System 100 includes engine 110, a starter-generator 130 electrically coupled to battery 140 by a lead 141 and belt or chain drive mechanism 10, namely a chain 160. Once started, engine 110 drives a flywheel 116 operatively connected to a transmission 105 to propel the vehicle and drives a crankshaft 112 having a crank pulley 114 operatively connected thereto.

Cooling system 120 includes a pump-shaft 122 having a pump pulley 124 operatively connected thereto and starter-generator 130 includes a starter-generator shaft 132 having a starter-generator sprocket 134 operatively connected thereto. Accessory belt 150 operatively connects crank pulley 114 and pump pulley 124. A chain 160 operatively connects starter-generator sprocket 134 and flywheel 116.

Upon activation by a user, starter-generator 130 draws energy from battery 140 through lead 141 to rotate starter-generator shaft 132. Shown in FIG. 13 in dotted lines, starter-generator shaft 132 in turn rotates starter-generator sprocket 134 to impart an engine-cranking torque 200 to chain 160. Thus, engine-cranking torque 200 acts on flywheel 116 to rotate engine 110 as required for engine starting procedures. During the starting of engine 110, chain 160 has a tight-side 133 and a slack-side 135 on either side of starter-generator sprocket 134. A tensioning system 180 is provided at slack-side 135 of chain 160 to remove the slack, keeping the chain in operative engagement with starter-generator sprocket 134.

After engine 110 has been started, starter-generator 130 generates an electrical output to battery 140 through lead 141. Engine 110, when running, rotates flywheel 116 and crankshaft pulley 114. Belt 150 being operatively connected to crankshaft pulley 114 and cooling system pulley 124, acts to rotate pump-shaft 122 to drive cooling system 120 in order to provide cooling to engine 110. Simultaneously, flywheel 116 imparts a generator-cranking torque 300 to chain 160.

Generator-cranking torque 300 acts on starter-generator shaft 132 to rotate starter-generator 130, which generates the electrical output to battery 140 through lead 141. During the generation of the electrical output to battery 140 by starter-generator 130, chain 160 has a tight-side 117 and a slack-side 118 on either side of flywheel 116, shown in FIG. 13 in solid lines. Tensioning system 180 is also provided at slack-side 118 of chain 160 to remove the slack, keeping the chain in operative engagement with flywheel 116.

Tensioning system 180 is an active tensioning system, namely it actively or automatically tensions chain 160 as needed. Tensioning system 180 includes a guide 182, a first idler sprocket 184, a second idler sprocket 186, and a spring 188. Guide 182, preferably a shaft, is mounted on engine 110 or elsewhere on the vehicle, such as, but not limited to the transmission, the exhaust manifold, or the vehicle body. First idler sprocket 184 is adapted to slide or float up and down on guide 182. Similarly, second idler sprocket 186 is adapted to slide or float up and down on guide 182. First idler sprocket 184 and second idler sprocket 186 are tied together by spring 188 such that the spring biases the sprockets 184, 186 towards one another. Thus, the assembly of first idler sprocket 184, second idler sprocket 186, and spring 188 are permitted to slide together on guide 182.

During starting, shown in FIG. 13 in dotted lines, the tension in tight-side 133 of chain 160 acts on second idler sprocket 186 to slide tensioning system 180 downwards until first idler sprocket 184 takes up the slack in slack-side 135. Thus, tensioning system 180 being in its lower position and being biased by spring 188 takes up the slack in chain 160. During generating, shown in solid lines, the tension in tight-side 117 of chain 160 acts on first idler sprocket 184 to slide tensioning system 180 upwards until second idler sprocket 186 takes up the slack in slack-side 135. Thus, tensioning system 180 being in its upper position and being biased by spring 188 takes up the stack in chain 160.

Friction between guide 182 and sprockets 184, 186 acts to dampen vibrations induced by chain 160 traveling. Alternately, an active means of damping (not shown) such as, but not limited to a hydraulic damper attached between guide 182 and sprockets 184, 186 and/or spring 188 is used to further dampen vibrations induced by traveling of chain 160.

Referring now to FIG. 14, a tensioning system 280 is illustrated. During the generation of the electrical output to battery 140 by starter-generator 130, chain 160 has a tight-side 117 and a slack-side 118 on either side of flywheel 116. During starting, chain 160 has a tight-side 133 and a slack-side 135 on either side of starter-generator pulley 134.

Tensioning system 280 is a constant tensioning system, namely it provides tension to chain 160 during starting, generating and static conditions. Tensioning system 280 includes a first or upper tensioning mechanism 282 and a second or lower tensioning mechanism 284. Upper tensioning mechanism 282 biases a low-friction chain guide 286 into operative engagement with chain 160 by a spring connection 288 mounted on engine 110 or elsewhere on the vehicle, such as, but not limited to the transmission, the exhaust manifold, or the vehicle body.

Lower tensioning mechanism 284 includes an idler sprocket 290 in operative engagement with chain 160. Sprocket 290 is rotatably mounted by a bracket 292 to engine 110 or elsewhere on the vehicle, such as, but not limited to the transmission, the exhaust manifold, or the vehicle body. Bracket 292 is adapted to mount idler sprocket 290 in operative engagement with chain 160. For example, bracket 292 includes a take-up system, such as but not limited to a screw 294 and a slot 296. Accordingly, lower tensioning mechanism 284 removes any initial slack from belt 160 in a normal or static state.

During starting or the application of starting torque 200, spring connection 288 of upper tensioning mechanism 282 biases low-friction chain guide 286 towards chain 160 to remove slack from slack-side 135. During generating or the application of generating torque 300, idler sprocket 290 continues to tension slack from slack-side 118 of chain 160, while low-friction chain guide 286 of upper tensioning mechanism 282 applies a very low drag force on the chain. Accordingly, during generating upper tensioning mechanism 282 does not affect the performance of chain drive mechanism 10 since the upper tensioning mechanism is not adding additional load to the chain.

Figure 15:
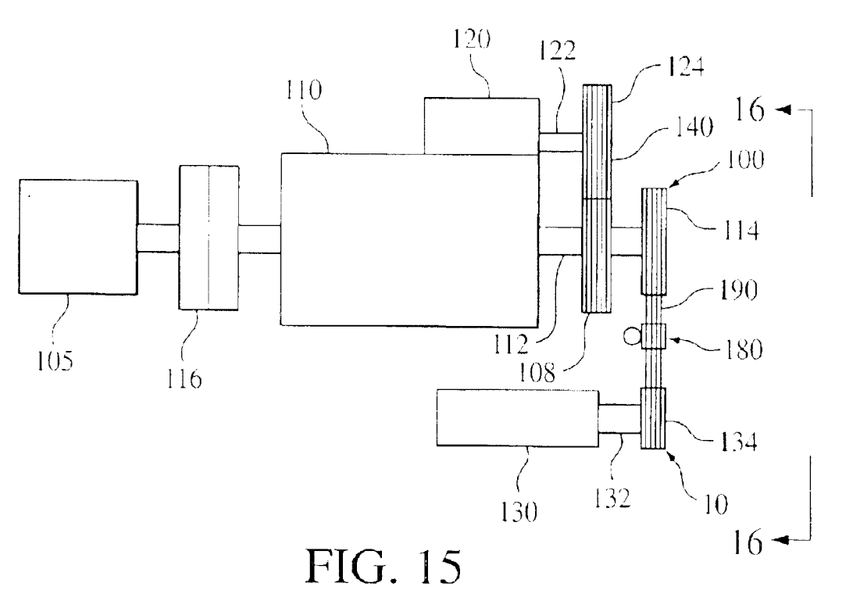
FIG. 15 is a top view of a third embodiment of a starter-generator system.
Figure 16:
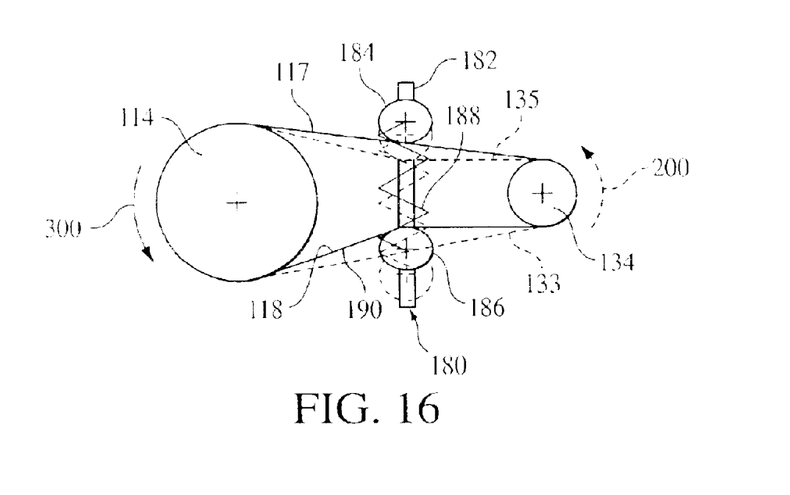
FIG. 16 is a view of a tensioning system for the starter-generator system of FIG. 15.

Yet another embodiment of starter-generator system 100 is provided in FIGS. 15 and 16. System 100 includes engine 110, a starter-generator 130 electrically coupled to battery 140 by a lead 141 and belt or chain drive mechanism 10, namely a belt 190. Once started, engine 110 drives a flywheel 116 operatively connected to a transmission 105 to propel the vehicle. Engine 110 includes a crankshaft 112 having an accessory pulley 108 and a crank pulley 114 operatively connected thereto.

Cooling system 120 includes a pump-shaft 122 having a pump pulley 124 operatively connected thereto and starter-generator 130 includes a starter-generator shaft 132 having a starter-generator pulley 134 operatively connected thereto. Accessory belt 150 operatively connects accessory pulley 108 and pump pulley 124. Belt 190 operatively connects starter-generator pulley 134 and crank pulley 114.

Upon activation by a user, starter-generator 130 draws energy from battery 140 through lead 141 to rotate starter-generator shaft 132. Shown in FIG. 16 in dotted lines, starter-generator shaft 132 in turn rotates starter-generator pulley 134 to impart an engine-cranking torque 200 to starter-generator belt 190. Thus, engine-cranking torque 200 acts on crank pulley 114 to rotate engine 110 as required for engine starting procedures. During the starting of engine 110, starter-generator belt 190 has a tight-side 133 and a slack-side 135 on either side of starter-generator pulley 134. Tensioning system 180 is provided at slack-side 135 of belt 190 to remove the slack, keeping the belt in operative engagement with starter-generator pulley 134.

After engine 110 has been started, starter-generator 130 generates an electrical output to battery 140 through lead 141. Engine 110, when running, rotates and crank pulley 114. Accessory belt 150 being operatively connected to accessory pulley 108 and cooling system pulley 124, acts to rotate pump-shaft 122 to drive cooling system 120 in order to provide cooling to engine 110. Simultaneously, crank pulley 114 imparts a generator-cranking torque 300 to belt 190.

Generator-cranking torque 300 acts on starter-generator shaft 132 to rotate starter-generator 130, which generates the electrical output to battery 140 through lead 141. During the generation of the electrical output to battery 140 by starter-generator 130, belt 190 has a tight-side 117 and a slack-side 118 on either side of crank pulley 114, as shown in FIG. 16 in solid lines. Tensioning system 180 is also provided at slack-side 118 of belt 190 to remove the slack, keeping the belt in operative engagement with crank pulley 114.

Tensioning system 180 shown in FIG. 16, similar to the discussion above with respect to FIG. 13, is an active tensioning system that actively or automatically engages belt 190 as needed. Tensioning system 180 includes guide 182, first idler pulley 184, second idler pulley 186, and spring 188. Guide 182, preferably a shaft, is mounted on engine 110 or elsewhere on the vehicle, such as, but not limited to the transmission, the exhaust manifold, or the vehicle body. First idler pulley 184 is adapted to slide or float up and down on guide 182. Similarly, second idler pulley 186 is adapted to slide or float up and down on guide 182. First idler pulley 184 and second idler pulley 186 are tied together by spring 188 such that the spring biases the pulley 184, 186 towards one another. Thus, the assembly of first idler pulley 184, second idler pulley 186, and spring 188 are permitted to slide together on guide 182.

During starting, shown in FIG. 16 in dotted lines, the tension in tight-side 133 of belt 190 acts on second idler pulley 186 to slide tensioning system 180 downwards until first idler pulley 184 takes up the slack in slack-side 135. Thus, tensioning system 180 being in its lower position and being biased by spring 188 takes up the slack in belt 190. During generating, shown in solid lines, the tension in tight-side 117 of belt 190 acts on first idler pulley 184 to slide tensioning system 180 upwards until second idler pulley 186 takes up the slack in slack-side 118. Thus, tensioning system 180 being in its upper position and being biased by spring 188 takes up the slack in belt 190.

For purposes of clarity, tensioning system 180 has been described by way of example as part of a two pulley/sprocket system. However, it is considered within the scope of the present invention for use of such tensioning systems 180 with pulley/sprocket systems having more than two pulleys.

A difference between torque and speed requirements for starting an engine versus generating electricity exists. The tensioning systems described herein ensure that the belt/chain remains operatively connected to its respective pulleys/sprockets. Thus, it has been determined that the effect of the torque difference on starter-generator 130 is minimized by adjusting the gear ratio of starter-generator pulley 134 with respect to crank pulley 114 (or flywheel 116).

Engine-cranking torque 200, namely the torque supplied to crankshaft 112, is equal to the torque provided by starter-generator 130 multiplied by the gear ratio of the starter-generator pulley 134 with respect to the crank pulley 114. The gear ratio should desirably be between 2:1 and 3:1. For example, if the gear ratio is 3:1 and engine 110 requires 150 foot-pounds of torque for starting purposes, starter-generator 130 must generate 50 foot-pounds (ignoring losses) to provide the required 150 foot-pounds at crankshaft 112.

Additionally, the electrical energy generated by starter-generator 130 is proportional to the speed of crankshaft 112. Thus, at higher crankshaft 112 speeds more electrical energy is generated, and, conversely, at lower crankshaft speeds less electrical energy is generated. Thus, in the example provided above where the gear ratio is 3:1, if crankshaft 112 has a speed of 1000 rpm, starter-generator shaft 132 has a resulting speed of 3000 rpm.

Setting the gear ratio at higher than the desired range of between 2:1 and 3:1, would decrease the amount of torque starter-generator 130 must generate to provide the required engine-cranking torque 200. For example, if the gear ratio is 10:1 and engine 110 requires 150 foot-pounds of torque for starting purposes, starter-generator 130 must generate only 15 foot-pounds (ignoring losses) to provide the required 150 foot-pounds at crankshaft 112. Moreover, in this example, if crankshaft 112 has a speed of 1000 rpm, starter-generator shaft 132 has a resulting speed of 10,000 rpm. Thus, when the ratio is set such that starter-generator 130 is required to produce low amounts of torque, the resulting speed of starter-generator shaft 132 tends to exceed the maximum rate determined from mechanical and/or electrical restrictions in high velocity revolution. However, it has been found that the desired ratio of between 2:1 and 3:1 balances the speed of starter-generator shaft 132 and the amount of torque starter-generator 130 must generate.

Thus, starter-generator system 100 provides a low cost method for achieving a starter-generator. Drive mechanism 10 includes simple active and passive tensioning systems. Moreover, starter-generator system 100 eliminates the need for gearboxes and their switching clutches to compensate for torque and speed differences during starting and generating.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for starting an internal combustion engine, comprising:

a starter-generator;

a drive mechanism drivingly connecting a portion of said starter-generator and a crankshaft of the internal combustion engine;

said drive mechanism being configured to transfer a first torque from said portion to said crankshaft when the internal combustion engine is being started such that said crankshaft is rotated by said starter-generator, said starter-generator facilitating the starting of the internal combustion engine when said crankshaft is rotated;

said drive mechanism being configured to transfer a second torque from said crankshaft to said portion when the internal combustion engine is running such that said portion is rotated by said crankshaft, said starter-generator generating an electrical current when said portion is rotated;

a first portion of said drive mechanism requiring tension during the transfer of said first torque;

a second portion of said drive mechanism requiring tension during the transfer of said second torque; and a tensioning mechanism configured to providing selectable active tension to said first and second portions of said drive mechanism independent of a tension applied to said first and second portions, said tension mechanism in operative engagement with only one of said first portion and said second portion, said tensioning mechanism providing tension to said drive mechanism at said first portion when said first torque is greater than said second torque.

2. The apparatus as in claim 1, wherein when said second torque is greater than said first torque, said tensioning mechanism provides tension to said drive mechanism at said second portion.

3. The apparatus as in claim 1, wherein said drive mechanism is a belt or a chain.

4. The apparatus as in claim 3, wherein said tensioning mechanism comprises an idler pulley biased into operative engagement with said drive mechanism.

5. The apparatus as in claim 1, wherein said drive mechanism connects said portion of said starter-generator and said crankshaft of the internal combustion engine at a crankshaft pulley of the internal combustion engine.

6. The apparatus as in claim 5, wherein said drive mechanism drivingly connects said portion of said starter-generator and said crankshaft of the internal combustion engine with a non-adjusting gear ratio.

7. The apparatus as in claim 6, wherein said non-adjusting gear ratio is in a range between 2:1 and 3:1.

8. The apparatus of claim 1, wherein said tensioning mechanism is configured to provide selectable active tension to said first and second portions of said drive mechanism is via an electrical actuator.

9. The apparatus of claim 8, wherein said electrical actuator is a solenoid.

10. The apparatus of claim 1, wherein said tension mechanism in operative engagement with only one of said first portion and said second portion includes retraction out of operative engagement with respect to the other of said first portion and said second portion.

11. The apparatus of claim 1, wherein said tensioning system is an active tensioning system configured for selective extension and retraction to increase a life of said drive mechanism.

12. The apparatus of claim 1, wherein said tensioning system applies tension to only one of said first and second portions defining an outside dimension of said drive mechanism.

* * * * *